(12) United States Patent
Ozolins et al.

(10) Patent No.: US 7,995,332 B2
(45) Date of Patent: *Aug. 9, 2011

(54) SUPPORT STRUCTURE FOR TWO OR MORE FLAT PANEL DEVICES

(75) Inventors: Helmars E. Ozolins, Orient, NY (US); Eric Nelson, Minneapolis, MN (US); Masamichi Udagawa, New York, NY (US); Peter D. Scott, Romulus, NY (US)

(73) Assignee: Bloomberg Finance L.P.

( * ) Notice: Subject to any disclaimer, the term of this patent is extended or adjusted under 35 U.S.C. 154(b) by 43 days.

This patent is subject to a terminal disclaimer.

(21) Appl. No.: 12/582,075

(22) Filed: Oct. 20, 2009

(65) Prior Publication Data

US 2010/0039758 A1    Feb. 18, 2010

Related U.S. Application Data

(63) Continuation of application No. 11/839,972, filed on Aug. 16, 2007, now Pat. No. 7,623,342.

(51) Int. Cl.
    *G06F 1/16* (2006.01)
(52) U.S. Cl. .............. 361/679.06; 248/276.1; 345/175
(58) Field of Classification Search .......... 248/279.1, 248/122.1, 917, 314, 309.1, 552, 460; 361/679.58, 361/679.32, 679.17, 679.57, 679.37, 679.21, 361/679.23, 679.48; 312/223.2, 263, 257.1, 312/248, 205; 345/82, 175
See application file for complete search history.

(56) References Cited

U.S. PATENT DOCUMENTS

| | | | |
|---|---|---|---|
| 5,687,939 A * | 11/1997 | Moscovitch | 248/122.1 |
| 6,102,348 A | 8/2000 | O'Niell | |
| 6,394,403 B1 | 5/2002 | Hung | |
| 6,427,288 B1 | 8/2002 | Saito | |
| 6,708,940 B2 | 3/2004 | Ligertwood | |
| 6,905,101 B1 | 6/2005 | Dittmer | |
| 6,915,995 B2 | 7/2005 | Gillespie | |
| 7,331,551 B2 * | 2/2008 | Oddsen, Jr. | 248/279.1 |
| 7,529,083 B2 * | 5/2009 | Jeong | 361/679.04 |
| 2003/0015632 A1 * | 1/2003 | Dunn et al. | 248/122.1 |
| 2004/0041062 A1 * | 3/2004 | Ozolins et al. | 248/122.1 |
| 2005/0257145 A1 | 11/2005 | Gage | |

FOREIGN PATENT DOCUMENTS

| | | |
|---|---|---|
| EP | 1 584 857 A | 10/2005 |
| JP | 11 007250 | 1/1999 |
| JP | 2004-191601 A | 7/2004 |
| WO | WO 01/37070 A2 | 5/2001 |
| WO | WO 03/092341 A2 | 11/2003 |

* cited by examiner

*Primary Examiner* — Hung V Duong
(74) *Attorney, Agent, or Firm* — Frommer Lawrence & Haug LLP

(57) ABSTRACT

A support structure for at least two flat panel display devices that permits adjustment of the at least two display devices in or about one or more axes, and a display system including such support structure and display devices while maintaining a constant space between the display devices in various configurations, alignments and orientations of the display devices. Such support structure, as provided in accordance with embodiments of the invention, provides for configuration of the at least two display devices, in a plurality of alignments in which fronts of the two display devices are generally aligned in a plane, for viewing together. Embodiments of the support structure provide for the two display devices to be positioned in a landscape and/or portrait configuration. Embodiments of the support structure provide for repositioning the display devices between horizontally and vertically-aligned configurations without disassembling the support structure itself and without disassembling either or both of the two display devices from the support structure.

4 Claims, 12 Drawing Sheets

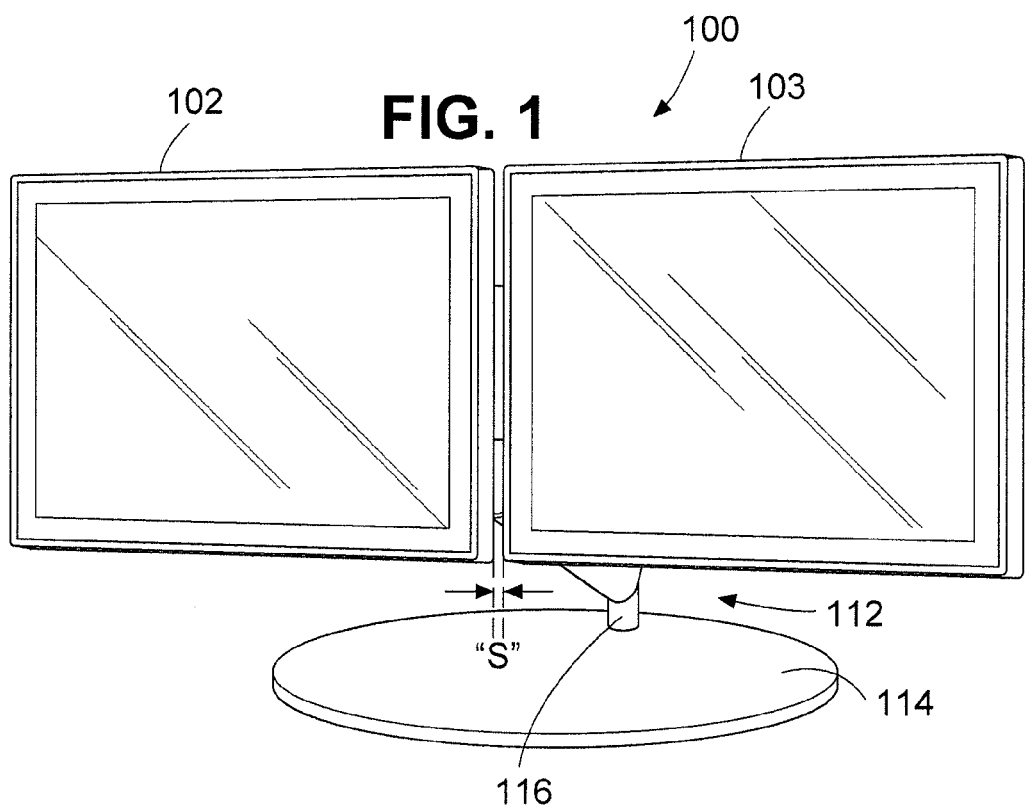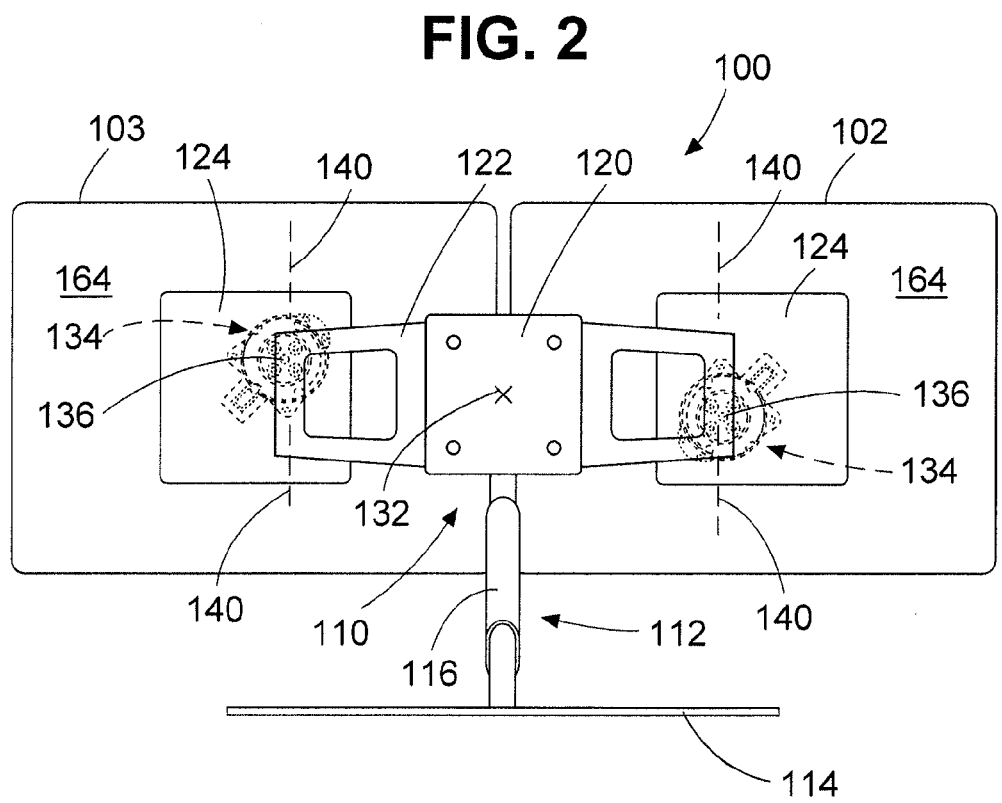

SUPPORT STRUCTURE FOR TWO OR MORE FLAT PANEL DEVICES

CROSS REFERENCE TO RELATED APPLICATION

This application is a continuation of application Ser. No. 11/839,972, filed Aug. 16, 2007, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The present invention relates to a support structure for two or more flat panel display devices, and other relatively thin display devices, e.g., flat screen or thin monitors, touch screens, televisions, etc., and to a display system including such support structure and display devices.

SUMMARY OF THE INVENTION

Embodiments of the invention provide a support structure for at least two flat panel display devices (or other relatively thin display devices) that permits adjustment of the at least two display devices in or about one or more axes, e.g., individually, together or cooperatively, and a display system including such support structure and display devices. (Depending upon context, "the at least two display devices" is sometimes referred to as "the two display devices.") Such support structure, as provided in accordance with embodiments of the invention, provides for configuration of, e.g., two display devices, in a plurality of alignments in which fronts of the two display devices are generally aligned, e.g., in a plane (with or without a display device or devices tilted toward the other display device or devices), for viewing together. Embodiments of the support structure provide for reconfiguring the display devices from one of the plurality of configurations to another of the plurality of positions, e.g., between horizontally and vertically aligned configurations of the fronts of the display devices, and without disassembling the support structure itself and without disassembling either or both of the two display devices from the support structure. (Such configurations of the fronts of the display devices are referred to herein simply as configurations of the display devices.) Embodiments of the support structure provide for the two display devices to be positioned in a landscape and/or portrait configuration or orientation. Thus, for example, in one embodiment, two display devices may be aligned in one configuration, e.g., horizontally, with either or both of the display devices either in landscape or portrait orientation, and may be reconfigured to be aligned, in another configuration, e.g., vertically, with either or both of the display devices either in landscape or portrait orientation.

In one embodiment, the support structure is supported on a laterally extending surface, e.g., a horizontal surface of a desk top, work station or table. In such an embodiment, the support structure may be supported from a stand contacting the laterally extending surface. An arm extending from a base portion of the stand may be provided to couple the support structure and the base portion. The base portion may or may not be fixed or clamped to the laterally extending surface.

In another embodiment, the support structure is supported by an upwardly extending surface, e.g., of a desk, work station or table, or by a wall. In such an embodiment, a bracket may be provided for connection, e.g., clamping, to the desk, work station, table or wall, and an arm may be provided extending from the bracket to couple the bracket and the support structure.

In some embodiments, adjustability may be provided by a stand, bracket or other mounting of the display devices in addition to the adjustability and configurability provided by the support structure.

In some embodiments, the support structure provides for rotation of each display about a separate axis, e.g., for changing the orientation of a display device between the landscape and portrait orientations.

According to some embodiments of the invention, the support structure may be arranged so that spacing between adjacent sides of the two display devices may be in separated by a space or gap (or in contact when the space equals zero), whether the two display devices are in vertically or horizontally aligned configurations, in landscape or portrait orientation. In some embodiments, the support structure provides for a space between adjacent sides of the two display devices that is the same when the display devices are in the horizontally aligned configuration and in the vertically aligned configuration. In one embodiment, the space is the same regardless of whether either or both display devices are in landscape or portrait orientation.

In changing between landscape and portrait orientations of a display device or devices, a display device is rotated about the separate axis, e.g., which extends horizontally. One aspect of the invention provides for the space between the two displays to be maintained the same after one or both displays have been rotated between the landscape and portrait orientations. Rotating the two displays more or less at the same time prevents the displays from contacting each other while being rotated between orientations. Alternatively, the support structure may provide, as described below, for one or both displays to be rotated about an axis perpendicular to the separate axes so that one display may be rotated between orientations without rotating the other display.

In one embodiment, the support structure supports two display devices for rotation together about a first axis, and for rotation of each of the two display devices individually about a respective second axis, e.g., the second axes are parallel to each other and to the first axis. (Use of the terms "first," "second," "third," "fourth" and "fifth" in connection with axis or axes is for convenience and ease of description.) In this embodiment, the two display devices may be rotated together, e.g., between a horizontally aligned configuration and a vertically aligned configuration, and each of the two display devices may be individually rotated, e.g., between a landscape orientation and a portrait orientation. For example, the two display devices may be reconfigured from a horizontally aligned, landscape orientation to a vertically aligned, landscape configuration by rotating the two display devices about the first axis together from the horizontally aligned to the vertically aligned configurations and also rotating each of the two display devices about a respective second axis to maintain them in landscape orientation, or, after the two display devices are in a vertically aligned configuration, rotating each of the two display devices about a respective second axis from portrait orientation back to landscape orientation.

In some embodiments, the support structure provides for each of the two display devices to be rotated about a third axis, e.g., perpendicular to the respective second axis. Such rotation about the third axis permits a particular display device to be adjusted relative to the plane described above (in which the fronts of the display devices may be vertically or horizontally aligned) to face towards or away from the other display device, or the fronts of both display devices may be adjusted to face towards or away from each other, etc.

For smaller spaces between adjacent sides of the two display devices, rotating one of the display devices (or both of the display devices in opposite directions) about the third axis offsets the display devices with respect to the plane referred to above and allows them to overlap and not touch each other during rotation thereof about respective second axes, e.g., rotation of only one display at a time.

In one embodiment of the support structure, the two display devices are rotatable about a respective second axis which is equidistant from adjacent sides of a respective rectangular display device. For a non-square, rectangular display device, the second axis is not located at the center of the display (which is equidistant from opposite sides of the display). The location of the second axis with respect to a respective display device is selected to provide a desired space between adjacent sides of the two display devices, as described above. Each second axis is offset relative to a non-square flat panel display device such that it is located equidistant from any two adjacent sides of the flat panel display device. This positioning enables the space between the flat panel display devices in horizontally and vertically aligned configurations to be maintained equal.

In some embodiments, the support structure comprises an arm to which the rear of each display device of the two display devices is rotatably coupled to rotate about a respective second axis, and a respective second axis coupling which rotatably couples a respective display device and the arm. In these embodiments, the support structure may comprise a bracket rotatably coupled to the arm for rotation of the arm (and the two display devices) about the first axis, and a first axis coupling which rotatably couples the respective bracket and the arm. In an embodiment in which the display devices are rotatable about respective third axes, a respective third axis coupling couples a respective second axis coupling to the arm.

Each second axis coupling may be positioned as discussed above for the second axis, e.g., equidistant from adjacent sides of the respective display device. In various embodiments, the first, second and third axes couplings may include friction, spring, and detent devices, etc., to facilitate rotation, positioning, and configuring of the display devices as described above. For example, the first, second and third axis coupling may be frictionally or spring loaded to maintain the position to which a display has been rotated or to facilitate rotation. In addition, the couplings may include stops or detents to limit the extent of rotation and/or provide for set rotated positions corresponding to horizontally and vertically aligned configurations of the display devices, and portrait and landscape orientation of the display devices.

A support for two flat panel display devices according to an embodiment of the invention comprises a base, a first arm extending from the base, and a second arm coupled to the first arm, spaced from the base, for rotation about a first axis. Each of the two flat panel display devices are adapted to be coupled to the second arm at spaced locations for rotation about a respective second axis, where each of the second axes is parallel to the first axis, offset from the center of the respective display device and equidistant from adjacent sides of the respective display device. Each of the two flat panel display devices also is adapted to be coupled to the second arm for rotation about a respective third axis normal to the first and second axes. In a display system comprising the two flat panel display devices coupled to the arm for rotation about respective second axes: the two flat panel display devices can be repositioned between a first configuration of the two display devices in which the two display devices are horizontally aligned with a space between the two display devices and a second configuration of the two display devices in which the two display devices are vertically aligned with the space between the first and second display devices by rotating the second arm about the first axis, the space being the same for the first and second configurations of the two display devices; and each of the two flat panel display devices can be repositioned between landscape and portrait orientation by rotation of a respective display device about a respective second axis.

In some embodiments, a bracket attached to the first arm is rotatably coupled to the second arm for rotation of the second arm about the first axis. In some embodiments, the bracket comprises VESA compliant structure.

A support for two flat panel display devices according to another embodiment of the invention comprises a base, a first arm extending upwardly from the base, and a second arm coupled to the first arm, spaced from the base, for rotation about a first axis. Each of the two flat panel display devices is adapted to be coupled to the second arm at spaced locations for rotation about a respective second axis parallel to the first axis. Each of the two flat panel display devices also is adapted to be coupled to the second arm for rotation about a respective third axis normal to the first and second axes. In a display system comprising the two flat panel display devices coupled to the second arm for rotation about respective first, second and third axes: the two flat panel display devices can be repositioned between a first configuration of the two display devices in which the two display devices are horizontally aligned and a second configuration of the two display devices in which the two display devices are vertically aligned by rotating the second arm about the first axis; each of the two flat panel display devices can be repositioned between landscape and portrait orientation by rotation of a respective display device about a respective second axis; and each of the two flat panel display devices can be rotated about the third axis in the horizontally and vertically aligned configurations to tilt towards and away from each other. In another embodiment, the support described in this paragraph may provide for rotation of the second arm about an axis perpendicular (sometimes referred to as the fourth axis) to the first axis such that the second arm can be rotated about this axis in the vertically and horizontally aligned configurations to tilt upwardly and downwardly. In another embodiment, the supports described in this paragraph may provide for rotation of the first arm about an axis (sometimes referred to as the fifth axis) such that the first arm, the second arm and the two displays can be rotated relative to the base about this axis. In one embodiment, the fifth axis extends vertically and is parallel to the third axis, and also perpendicular to the base.

A support for two flat panel display devices according to another embodiment of the invention comprises a bracket, an arm, a first axis coupling that couples the arm to the bracket for rotation about a first axis, a second axis coupling for each of the two flat panel display devices adapted to couple the arm to the respective display device via a respective third axis coupling for rotation about a respective second axis parallel to the first axis, where the second axis couplings are equidistantly spaced from the first axis on opposed sides thereof. A respective third axis coupling is adapted to couple a respective display to a respective second axis coupling for rotation about respective third axis perpendicular to the respective second axes and to the first axis. Each second axis coupling is adapted to be connected to a respective display device at a location offset from the center of the respective display device and equidistant from adjacent sides of the respective display device. In this embodiment:

the two flat panel display devices can be repositioned between a first configuration of the two display devices in which the two display devices are horizontally aligned with a space between the two display devices and a second configuration of the two display devices in which the two display devices are vertically aligned with the space between the first and second display devices by rotating the second arm about the first axis, the space being the same for the first and second configurations of the two display devices; each of the two flat panel display devices can be repositioned between landscape and portrait orientation by rotation of a respective display device about a respective second axis; and each of the two flat panel display devices can be rotated about the third axis in the horizontally and vertically aligned configurations to tilt towards and away from each other.

In some embodiments, a detent is provided corresponding to a position of the second arm in which the first and second display devices are in the horizontally aligned configuration and a detent is provided corresponding to a position of the second arm in which the first and second display devices are in the vertically aligned configuration.

In some embodiments, a detent is provided corresponding to a position of a respective display in landscape orientation and a detent is provided corresponding to a position of a respective display in portrait orientation.

According to the embodiments disclosed herein, two flat panel displays are supported for adjustment about one, two, three, four or five axes.

Display systems comprising two flat panel display devices and a support therefor, e.g., as described above, are also provided according to embodiments of the invention.

BRIEF DESCRIPTION OF THE DRAWINGS

Embodiments of the invention are illustrated in the figures of the accompanying drawings which are meant to be exemplary and not limiting, and in which like references are intended to refer to like or corresponding parts.

FIG. 1 is a front perspective view of a display system including a pair of flat panel display devices and a support structure therefor, depicting the display devices supported in a horizontally aligned configuration in a landscape orientation in accordance with an embodiment of the invention.

FIG. 2 is a rear view of the display system depicted in FIG. 1.

FIG. 18 shows the coupling in a detent position corresponding to landscape orientation of the horizontally aligned configuration of the display device; FIG. 19 shows the coupling during movement of the display device between the two detent positions of the coupling; and FIG. 20 shows the coupling in a detent position corresponding to landscape orientation of a vertically aligned configuration of the display device.

DESCRIPTION OF PREFERRED EMBODIMENTS

Figure 3:
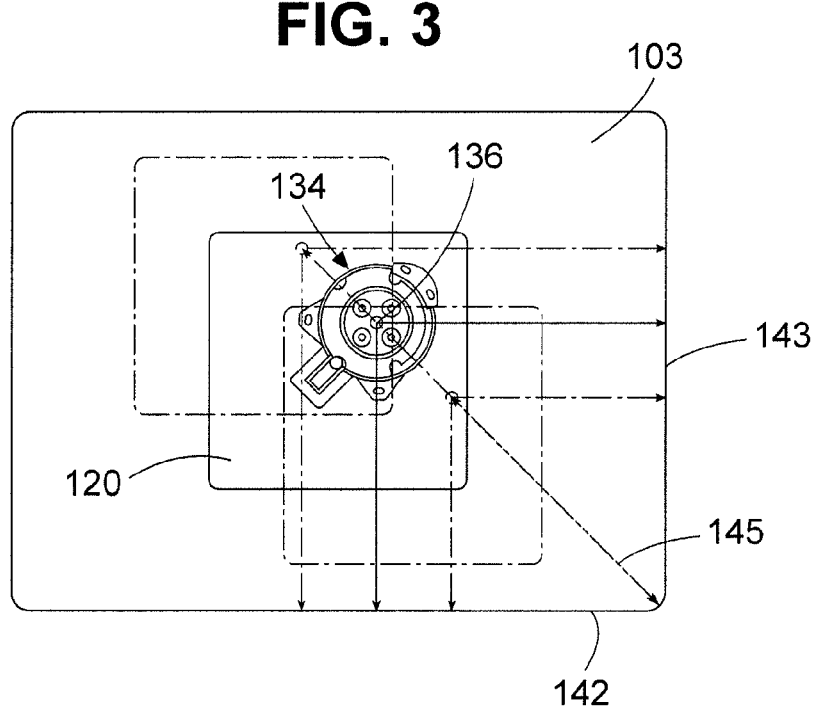
FIG. 3 a schematic rear view of a flat panel display device of the display system depicted in FIG. 1 illustrating possible points of attachment of the flat panel device to the support structure for rotation about the second axis referred to above.

Embodiments of the present invention will now be described with reference to the drawings. Referring to FIG. 1, the display system 100 according to an embodiment of the invention includes two display devices 102 and 103, sometimes referred to as a dual panel display. Although an embodiment of a multiple display device system is illustrated and described in connection with two display devices, it should be understood that embodiments may include more than two display devices. The display devices 102, 103 illustrated in the drawings are flat panel display devices, which may be used for a various applications, e.g., as computer monitors, televisions, presentation devices, etc. The term flat panel display device is meant herein in a broad sense and encompasses various models and types of relatively thin electronic display devices (thin compared, e.g., to cathode ray tube devices). In the embodiment depicted in FIG. 1, display devices 102, 103 may, for example, be flat panel LCD or plasma type electronic display devices, e.g., of a size suitable for use on a desktop or work station, etc.

The display devices 102, 103 are supported by a support structure 110, shown for example in FIG. 2. In the embodiment depicted in FIGS. 1 and 2, the support structure 110 is supported from a stand 112 including a base 114, adapted to stand on a laterally extending surface such as a desktop, work station top, table top, etc., and an arm 116 that is attached at one end to the base 114 and at the other end to the support structure 110. The arm 116 may be articulated to the base 114 and/or support structure 110 for, e.g., positioning purposes. In other embodiments, the support structure 110 may be supported from an upwardly extending surface by, e.g., an arm and bracket, or from surfaces and structure using suitable devices.

Referring to FIG. 2, the support structure 110, comprises a bracket 120 and an arm 122, and the display devices 102, 103 include a rear cover 124. A first axis coupling 130 (FIG. 21) rotatably couples the bracket 120 and the arm 122 for rotation of the arm 122 (and the display devices 102, 103 as a unit) about a first axis 132 (indicated by an "x" mark in FIGS. 2, 4 and 6). The first axis 132 (FIG. 2) extends horizontally and perpendicular to the major sides of the display devices 102, 103. Rotation of the arm 122 about the first axis 132 (see FIG. 4) repositions the display system 100 between a horizontally aligned configuration, landscape orientation (FIGS. 1 and 2) and a vertically aligned configuration, landscape orientation (FIGS. 5 and 6) of display devices 102, 103.

Figure 4:
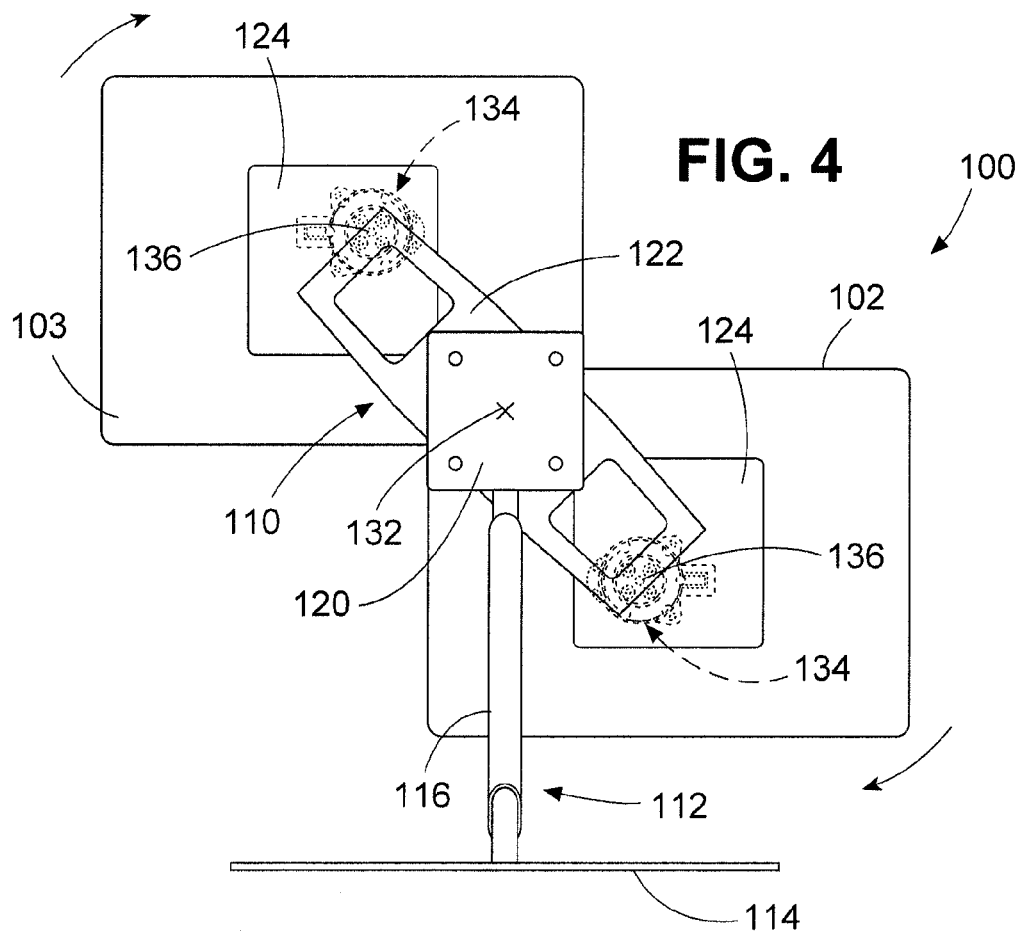
FIG. 4 is a rear view of the display system depicted in FIGS. 1 and 2 in which the flat panel display devices are being rotated about the first axis referred to above and about the second axis during rotation about the first axis to reconfigure the display devices from the horizontally aligned configuration, landscape orientation depicted in FIG. 1 to the vertically aligned configuration, landscape orientation depicted in FIGS. 5 and 6.
Figure 6:
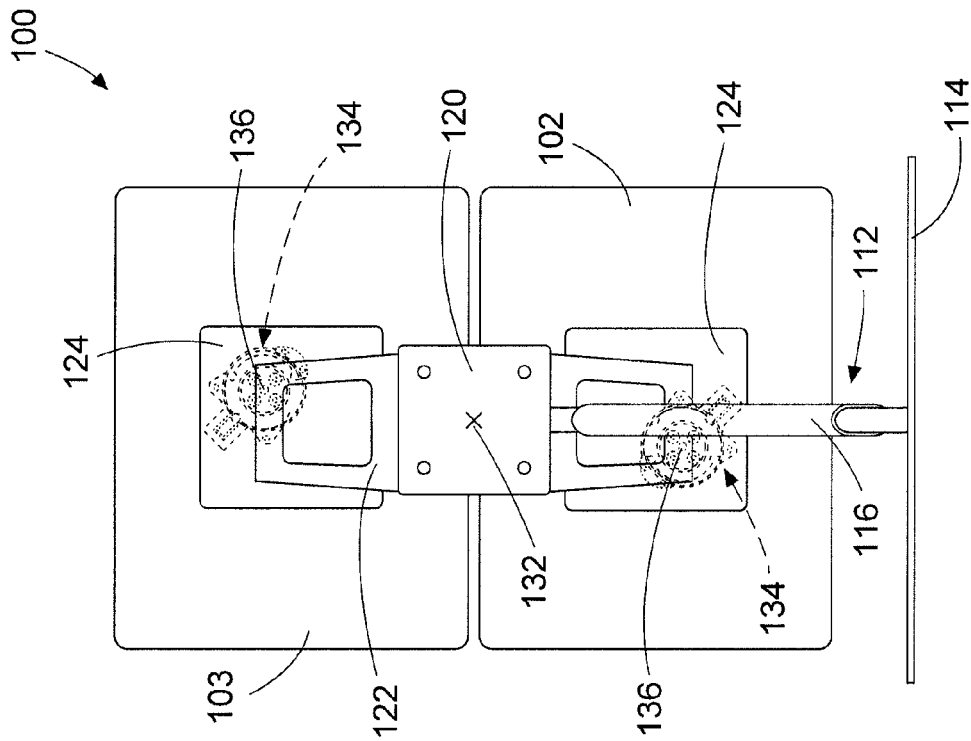
FIGS. 5 and 6 are front and rear views, respectively, of the display system depicted in FIGS. 1 and 2 with the display devices supported in a vertically aligned configuration in landscape orientation.

A respective second axis coupling 134 (FIG. 17) couples the arm 122 and each display device 102, 103 (either directly or through a respective third axis coupling 138 where the embodiment provides for rotation about a third axis 140) for rotation about a respective second axis 136 (FIGS. 2, 4 and 6). (The second axis coupling is shown in broken lines in FIGS. 2, 4 and 6). Embodiments of the invention may provide a support structure and/or display system in which display devices are rotatable about the second axis alone, or in combination with rotation about one or more other axes, e.g., the first, third, fourth and/or fifth axes. Each second axis 136 extends horizontally, and is perpendicular to the major sides of the respective display devices, and is parallel to the first axis 132. Rotation of a display device 102, 103 about a second axis 136 repositions a display device between landscape and portrait orientations of the display devices when the display devices are not also reconfigured between vertically or horizontally aligned configurations. Rotation of a display device 102, 103 about a second axis 136 while the arm 122 and display devices 102, 103 are being rotated about the first axis 132 to reconfigure between vertically and horizontally aligned configurations of the display devices maintains the respective display device in the landscape or portrait orientation existing prior to reconfiguration.

Figure 7:
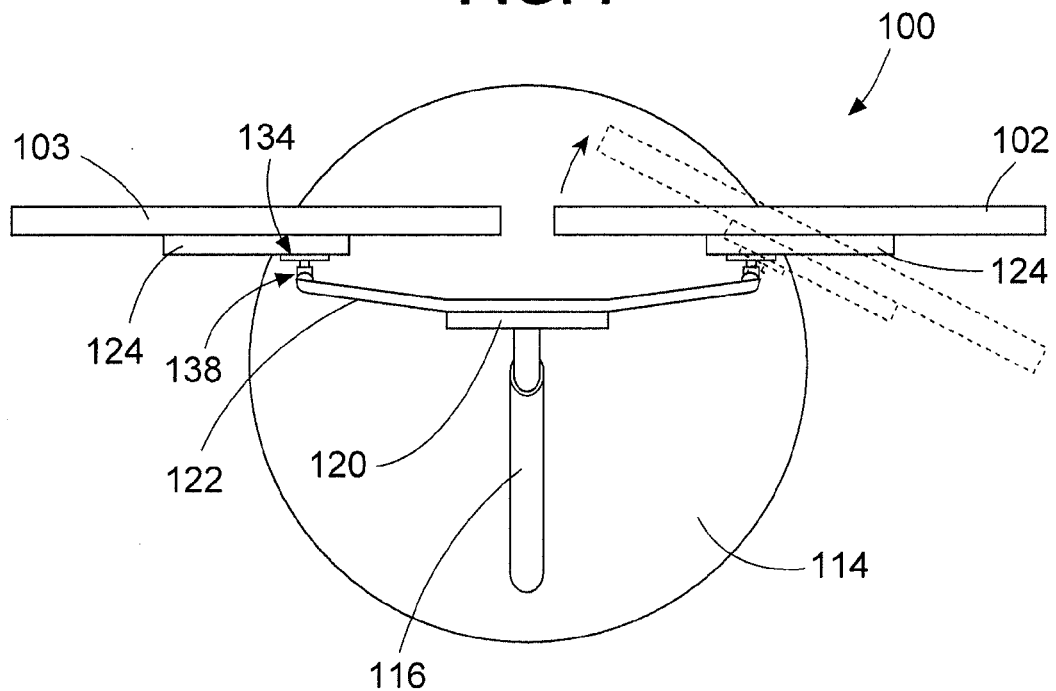
FIGS. 7-9 are top views of the display system depicted in FIGS. 1 and 2 illustrating reconfiguration of the display devices from the horizontally aligned configuration, landscape orientation, of FIGS. 1, 2 and 7 to the vertically aligned configuration, landscape orientation, of FIGS. 5, 6 and 9.

In embodiments providing for rotation about a third axis, a respective third axis coupling 138 (FIG. 17) couples the arm 122 and each second axis coupling 134 for rotation or tilting of a display device 102, 103 about the third axis 140 (FIGS. 2 and 7). For example, third axis couplings 138 provide for tilting of the respective display devices, e.g., towards each other, as shown for example in FIGS. 10 and 11 (or away from each other, etc.), and for offsetting the display devices when the display system configuration is being changed between horizontally and vertically aligned configurations, as shown for example in FIGS. 7 and 8. Referring to FIGS. 2 and 7, the third axis 140 extends vertically with respect to the display devices and is perpendicular with respect to the first axis 132 and the second axes 136.

Figure 5:
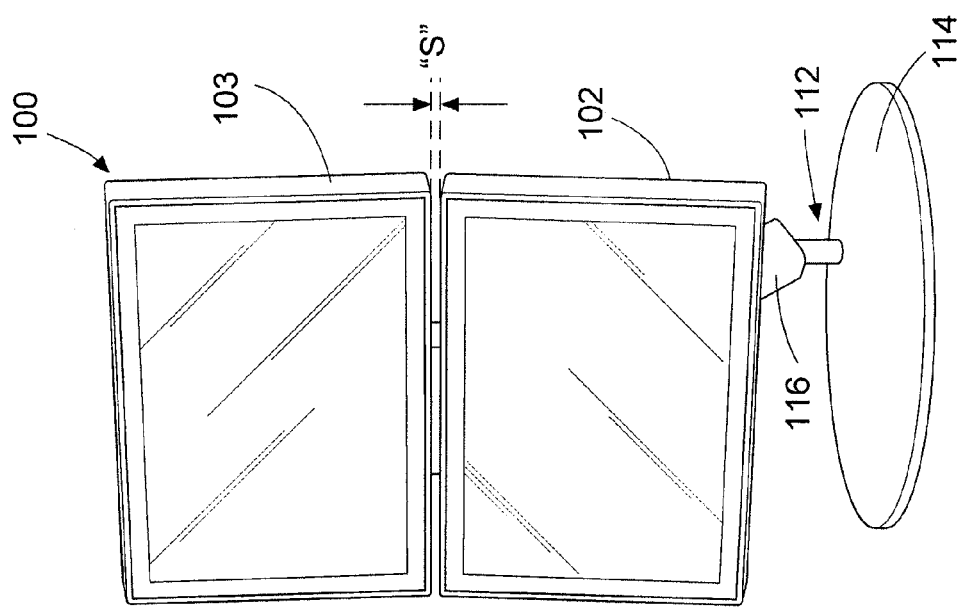
Figure 13:
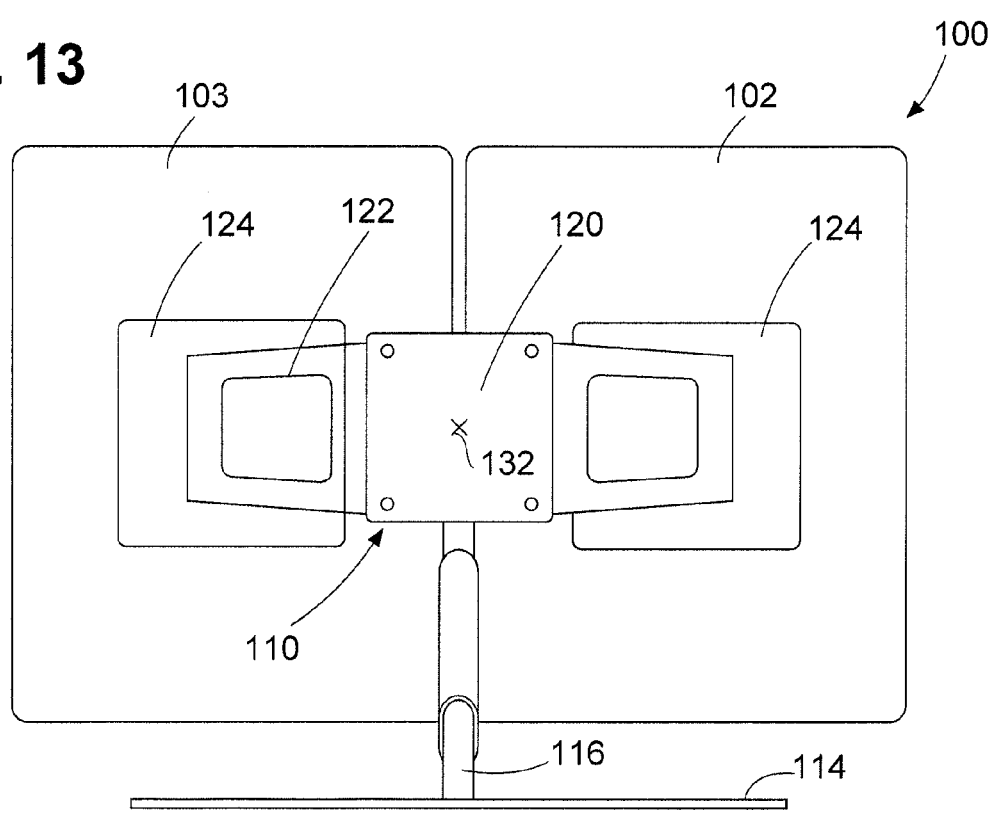
Figure 14:
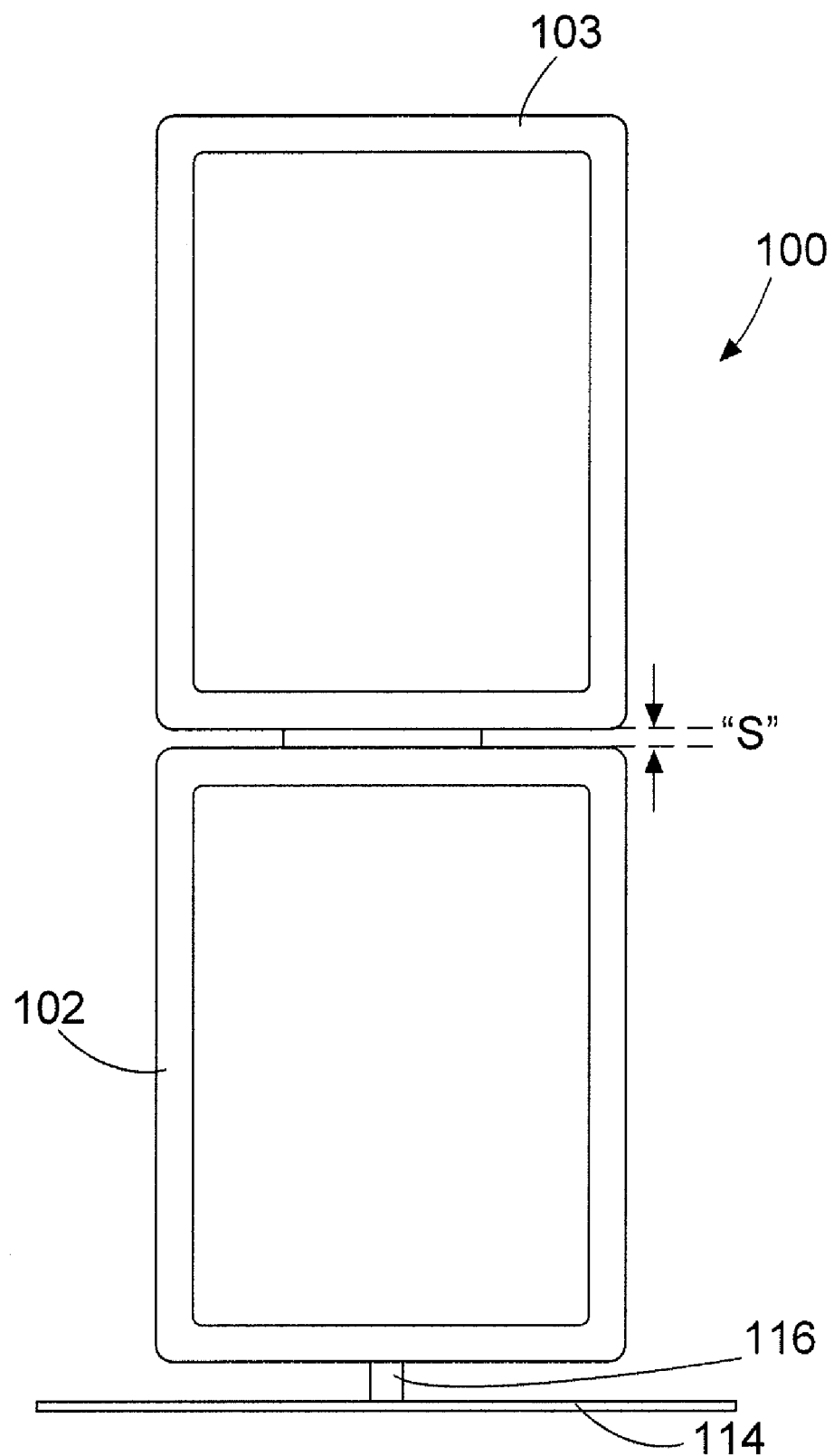
FIGS. 14 and 15 are front and rear views, respectively, of the display system depicted in FIGS. 1 and 2, with the display devices in the vertically aligned configuration in portrait orientation.
Figure 15:
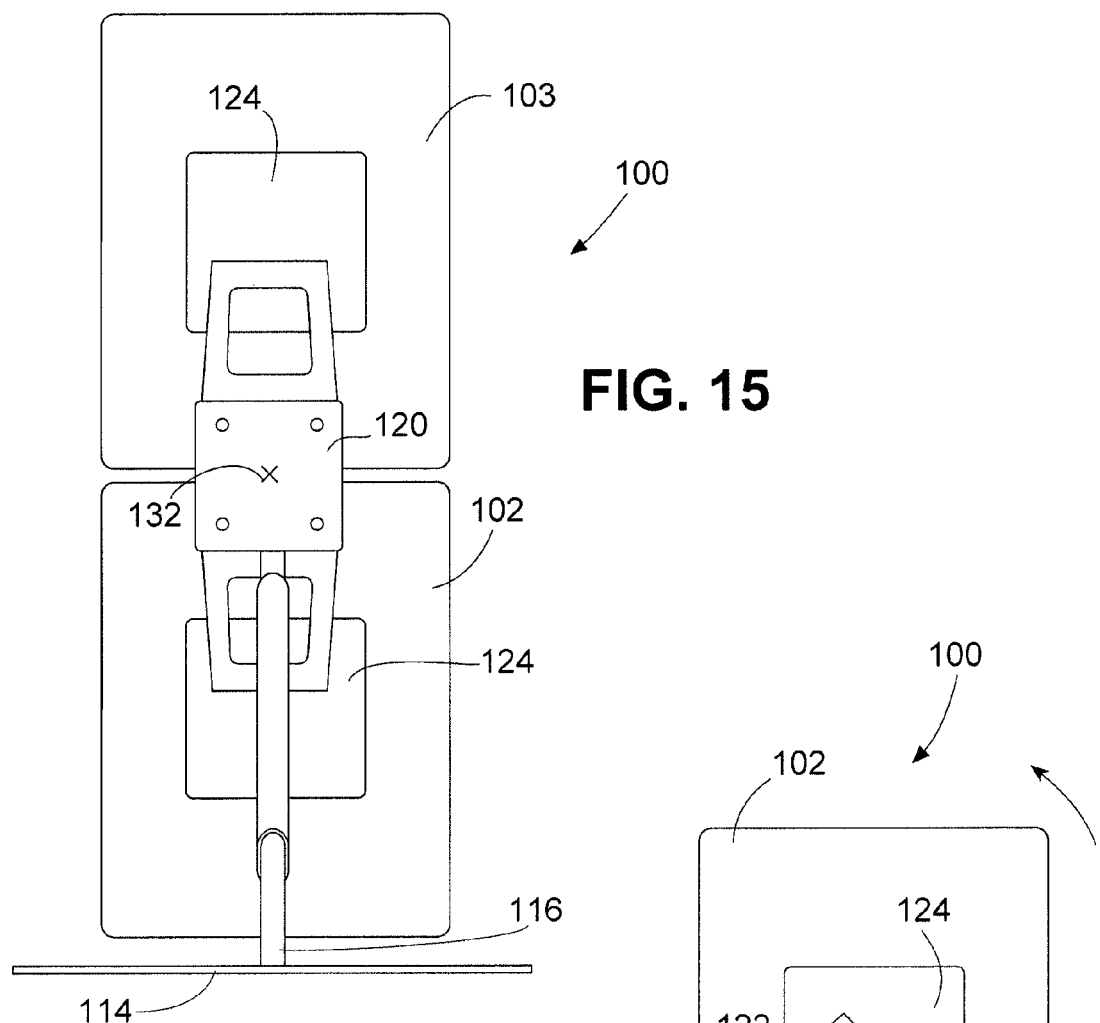

The first axis coupling 130 (FIG. 21) may be any suitable rotation or pivot joint that allows for rotation of the arm 122 about the first axis 132 (FIGS. 2 and 4) with respect to the bracket 120 while maintaining the rotated position of the arm 122 at least at home, e.g., detent, positions corresponding to a horizontally aligned configuration (FIGS. 1 and 2 for landscape orientation and FIGS. 12 and 13 for portrait orientation), and a vertically aligned configuration (FIGS. 5 and 6 for landscape orientation and FIGS. 14 and 15 for portrait orientation). A specific implementation of the first axis coupling 130 is described below in connection with FIG. 21.

The bracket 120 (FIG. 4) is positioned sufficiently spaced from the base 114 such that the arm 122 with the display devices 102, 103 may rotate about the first axis 132, with appropriate rotation of display device 102 and 103 about respective second axes 136, without contacting the base 114 during reconfiguration between horizontally and vertically aligned configurations. Bracket 120 may be a Video Electronics Standards Association (VESA) compliant plate, or any suitable bracket. Correspondingly, the arm 122 is preferably VESA compliant to facilitate mounting thereof to bracket 120. If desired, a VESA compliant bracket 120 may be attached to any VESA-compliant device, and the base 114, arm 116 and bracket 120 may be provided as a VESA compliant support. Similarly, the arm 122 may be attached to other suitable VESA compliant support devices.

Figure 12:
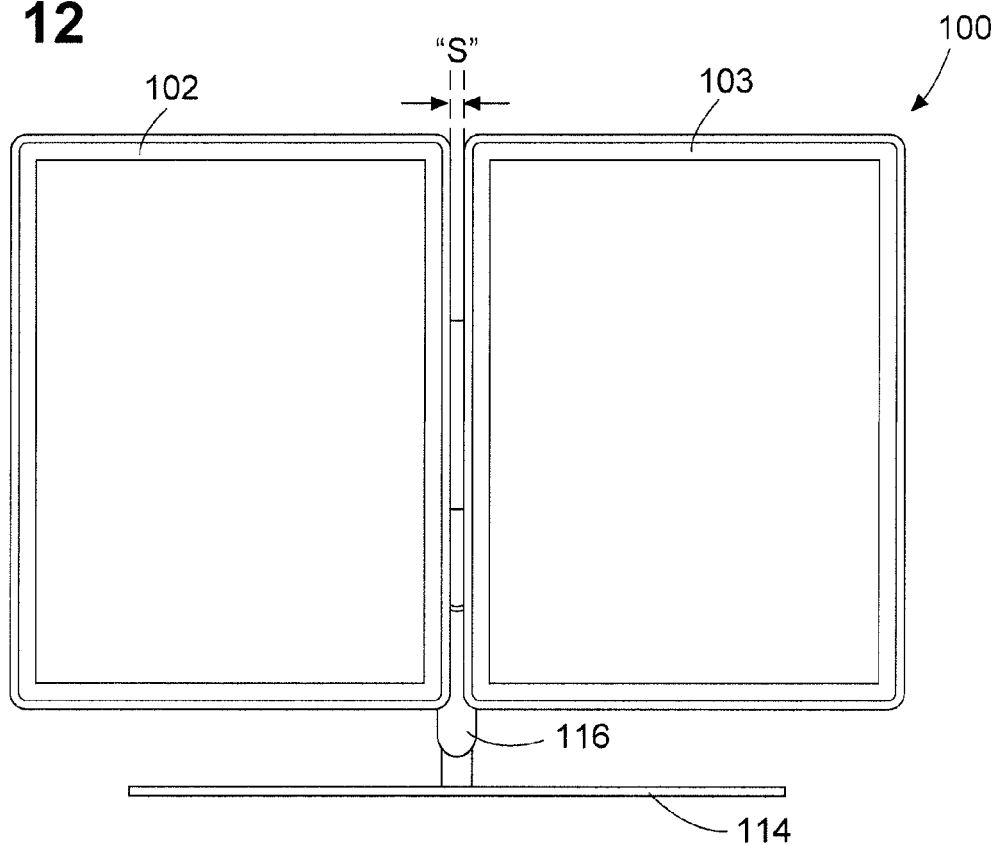
FIGS. 12 and 13 are front and rear views, respectively, of the display system depicted in FIGS. 1 and 2, with the display devices in the horizontally aligned configuration in portrait orientation.

The second axes coupling 134 (FIG. 2) may be any suitable rotation or pivot joint that allows for rotation of a display device 102, 103 about the second axis 136 with respect to the arm 122 while maintaining the rotated position of the display device at least at home, e.g., detent, positions corresponding to a landscape orientation (FIG. 1) and a portrait orientation (FIG. 12). A specific implementation of a second axis coupling 134 is described below in connection with FIG. 17.

Referring to FIG. 3, the second axis 136 is positioned equidistant from any respective two adjacent edges of a respective display device 102, 103. In the illustrated embodiments, the overall geometric shape of displays 102, 103 is rectangular but not square. Therefore, a point that is equidistant from adjacent sides would not be in the geometric center of the display device (midway between each pair of opposite sides), but offset therefrom. Locating the second axis 136 at a point equidistant from adjacent sides of a respective display 102, 103 enables a selected space "s" (which could be zero, as mentioned above) (determined as described herein) (see FIGS. 1, 5, 12 and 14) to be maintained between displays 102, 103 when in the horizontally aligned and vertically aligned configurations. The space "s" is determined by the dimensions of the displays and an equal distance from the first axis 132 to each second axis 136. Positioning of second axis 136 is also selected to provide for a desired alignment of the displays 102, 103 in various configurations and orientations. For the configurations and alignments depicted in the drawings, i.e., with the display devices horizontally or vertically aligned, and for 15 inch display devices and a space "s" in the range of ¼ inch to ¾ inch, the second axis 136 is located at a point in the upper right quadrant of display device 103 near the geometric center as viewed from the back thereof, and for display device 103, at a corresponding point in the lower left quadrant (both such points being with reference to the display system in the horizontally aligned configuration, landscape orientation, as depicted in FIG. 2 for display devices 102 and 103). The exact position will depend on the exact dimensions of the display device and can easily be determined based on the description herein. This offset location of the second axis 136 maintains the same set space "s" between display devices when the display devices are in a horizontally aligned configuration (in both landscape and portrait orientations) (FIGS. 1 and 5) and in a vertically aligned configuration (in both landscape and portrait orientations) (FIGS. 12 and 14), which unifies the presentation of display devices 102, 103 regardless of the particular configuration and orientation of the display devices.

FIG. 3 illustrates possible positions of second axis 136 on a display device, e.g., display device 103. Points equidistant from adjacent sides 142, 143 of the display define a line 145, which is not a diagonal and does not pass through the geometrical center of the display. Therefore, points on line 145 are offset as described above. Placement of second axis 136 on line 145 maintains the set spacing "s." As mentioned, a particular selected point on line 145 of axis 136 provides for a desired relative positioning of the displays in various configurations and orientations. The point that corresponds to a desired relative positioning can be easily determined, e.g., empirically.

Figure 8:
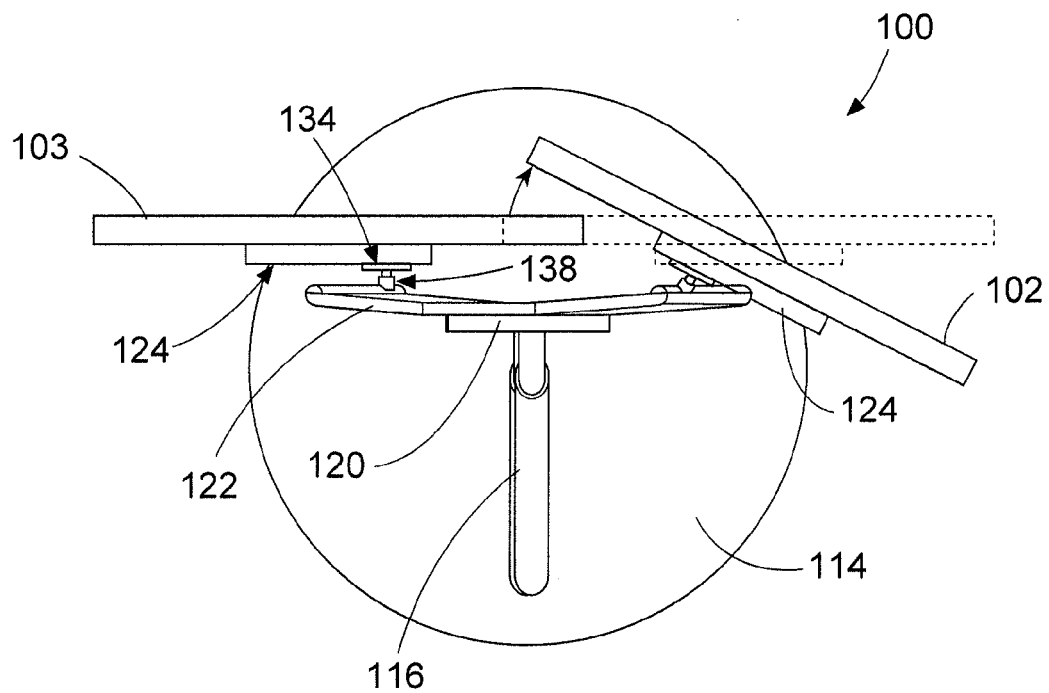
Figure 9:
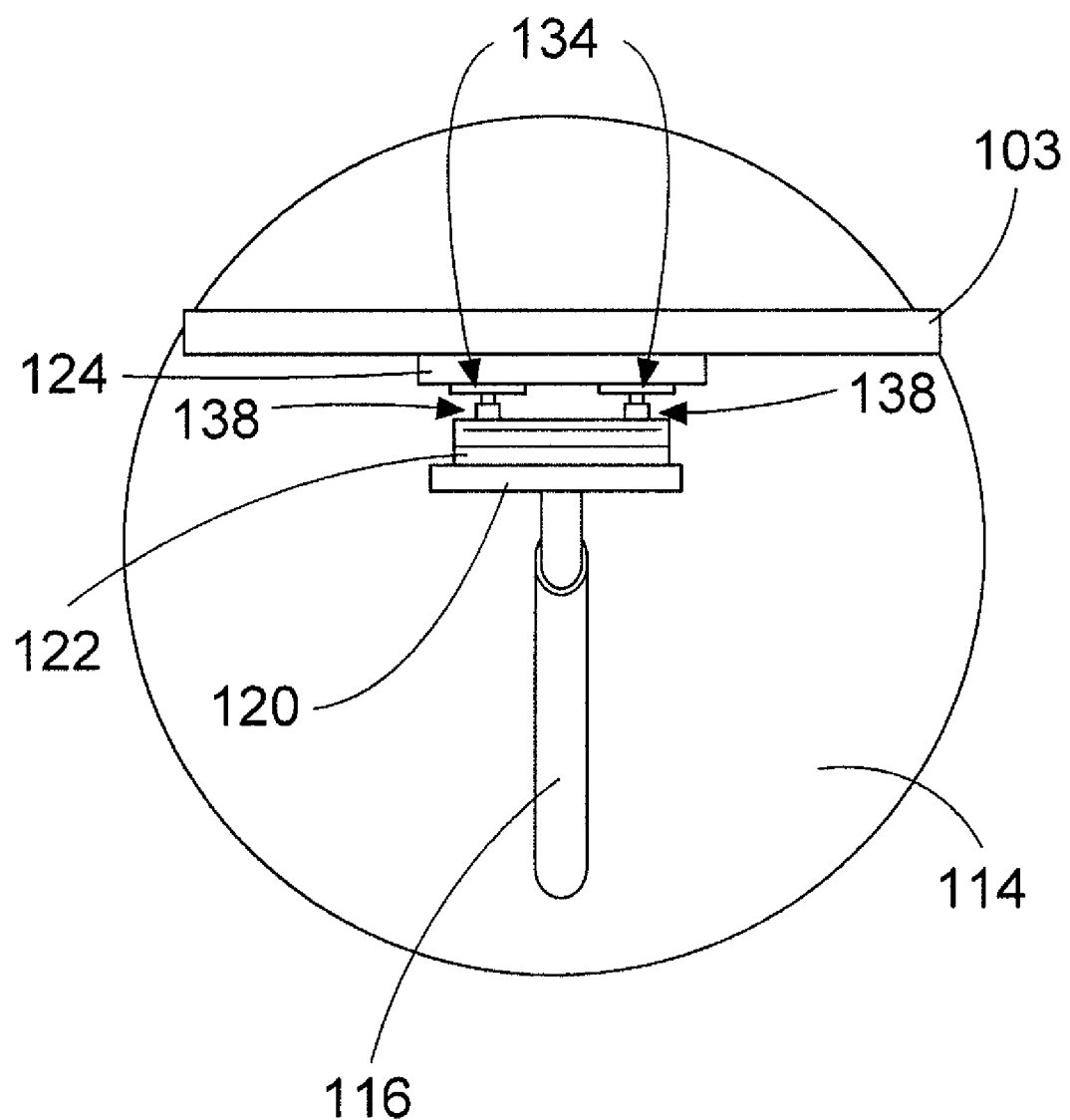

FIGS. 2, 4 and 7-9 illustrate changing the presentation display system configuration of display devices 102, 103 from horizontally aligned, landscape orientation, to vertically aligned, landscape orientation. (Changing from a vertically aligned configuration to a horizontally aligned configuration is similar and therefore will not be described in detail.) The change between horizontally aligned and vertically aligned configurations of display devices 102, 103 includes a rotation of arm 122 about the first axis 132 (FIG. 4) (which provides for the change between horizontally and vertically aligned configurations) and rotation of each display about a respect second axis 136 (which maintains the particular landscape or portrait orientation). As discussed above, to provide clearance between display devices 102, 103 during the rotation thereof about respective second axes 136, one of the display devices 102, 103 is rotated (tilted) about the third axis 140, as illustrated in FIGS. 7-8. With display device 102 being rotated about second axis 136 (FIGS. 7 and 8), clearance is provided between display devices 102 and 103 as arm 122 is rotated about the first axis 132 and each display device 102, 103 is rotated about a respective second axis 136, as illustrated in FIGS. 4 and 8. FIGS. 1, 2 and 7 illustrate the relative positions of the display devices and the first, second and third axes in the horizontally aligned configuration, landscape orientation, and FIGS. 5, 6 and 8 illustrate the relative positions of the display devices and the first, second and third axes in the vertically aligned configuration, landscape orientation.

Figure 16:
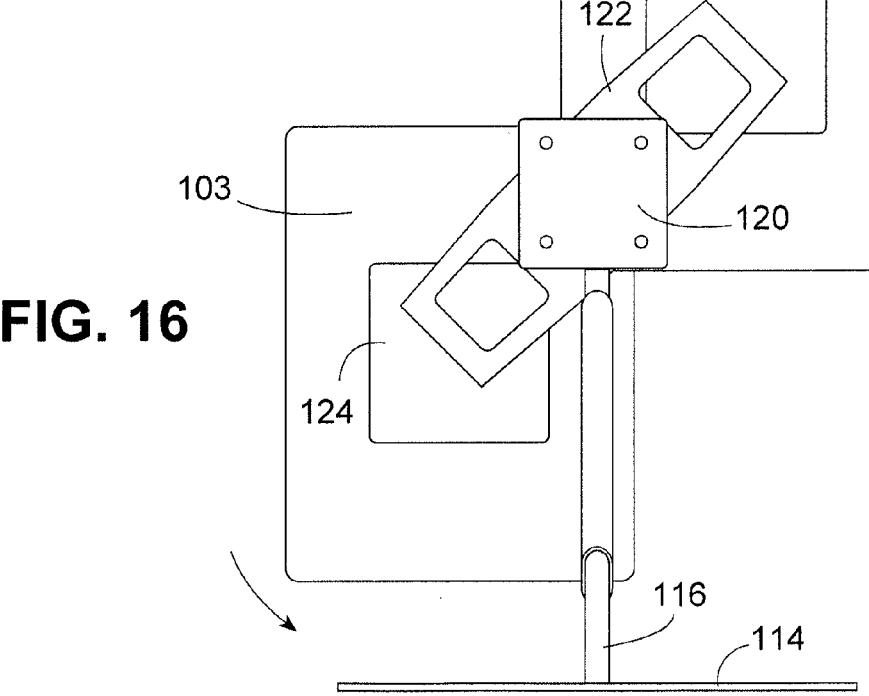
FIG. 16 is a rear view of the display system depicted in FIGS. 1 and 2, in which the display devices are being rotated about the first and second axes during reconfiguration of the display devices from the vertically aligned configuration, portrait orientation, depicted in FIGS. 14 and 15, to the horizontally aligned configuration, portrait orientation, depicted in FIGS. 12 and 13.

With the displays in portrait orientation (FIGS. 12-15), the reconfiguration between horizontally aligned and vertically aligned configurations is similar to the reconfiguration described above for landscape orientation. After one of the display devices 102 or 103 is tilted about a third axis 140, arm 122 is rotated about first axis 132 and each of the displays 102, 103 is rotated about a respective second axis 136 to maintain the portrait orientation of each display, as illustrated in FIG. 16.

Each of the third axis couplings 138 (FIG. 17) may be any suitable rotation or pivot joint that allows for limited rotation or tilting of the respective display device 102, 103 about a respective third axis 140 while maintaining the rotated or tilted position of the respective display. A specific implementation of a third axis coupling 138 is described below in connection with FIG. 17.

Figure 10:
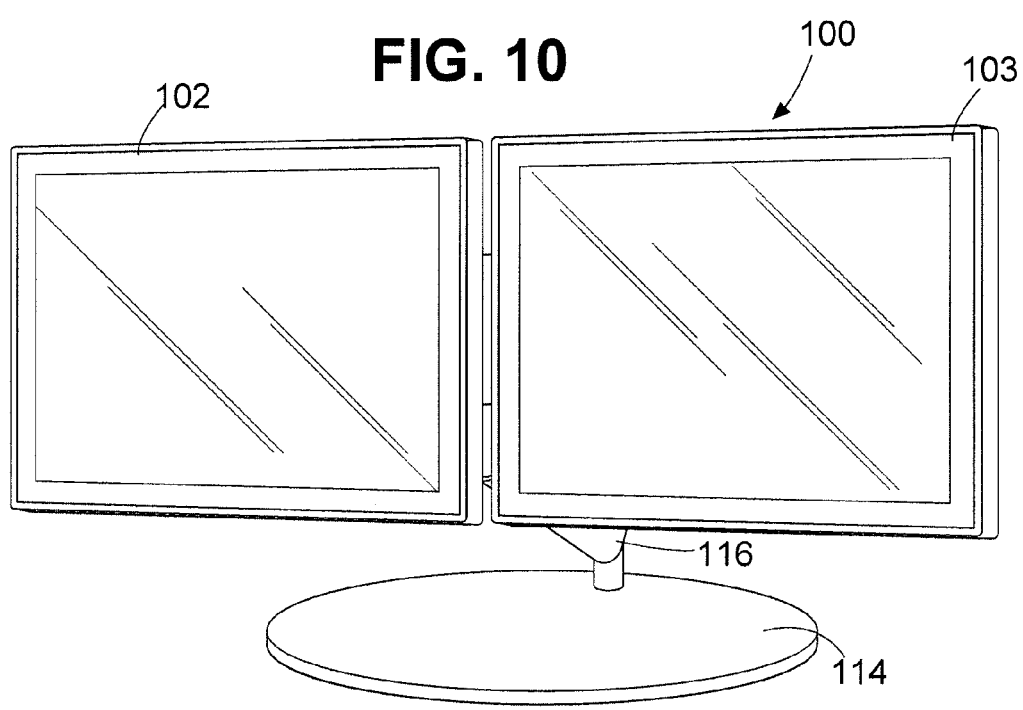
FIGS. 10 and 11 are front perspective views of the display system depicted in FIGS. 1 and 2 in the horizontally aligned and vertically aligned configurations respectively, with the display devices in landscape orientation and tilted towards each other.
Figure 11:
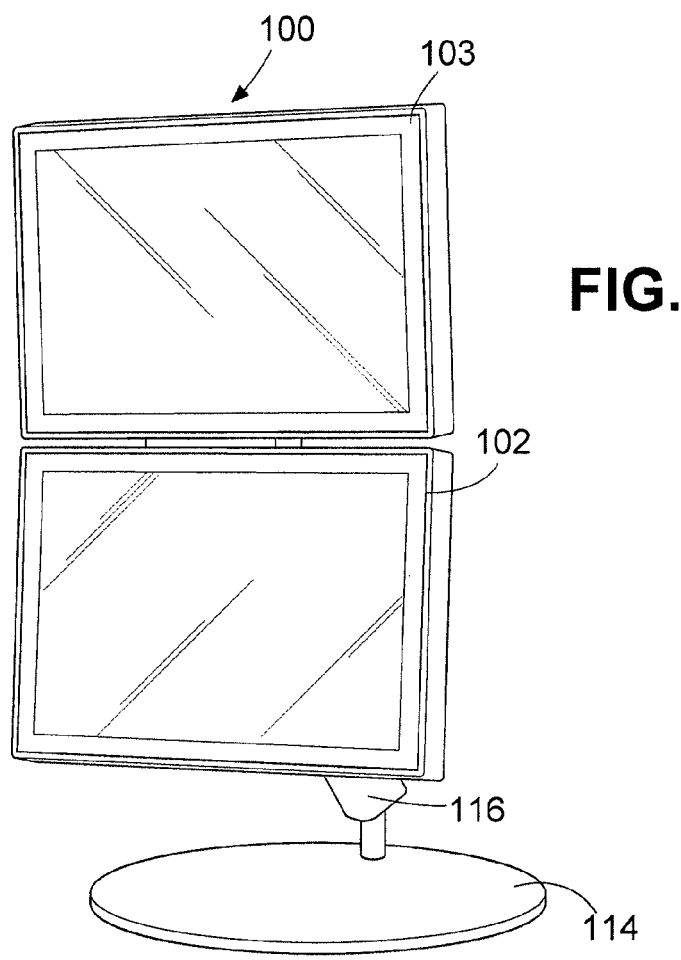

Each display device 102, 103 can be independently tilted towards or away from each other in both the vertically aligned and horizontally aligned configurations, in both landscape and portrait orientations. This is illustrated in FIG. 10 where the display devices 102, 103 are tilted about a respective third axis 140 (FIG. 2) towards each other in the horizontally aligned configuration, landscape orientation, and in FIG. 11, where the display devices 102, 103 are tilted about a respective third axis 140 towards each other in the vertically aligned configuration, landscape orientation. As mentioned, tilting is accomplished by rotating a particular display about its third axis 140. The displays 102, 103 can similarly be tilted in portrait orientations not shown.

Figure 17:
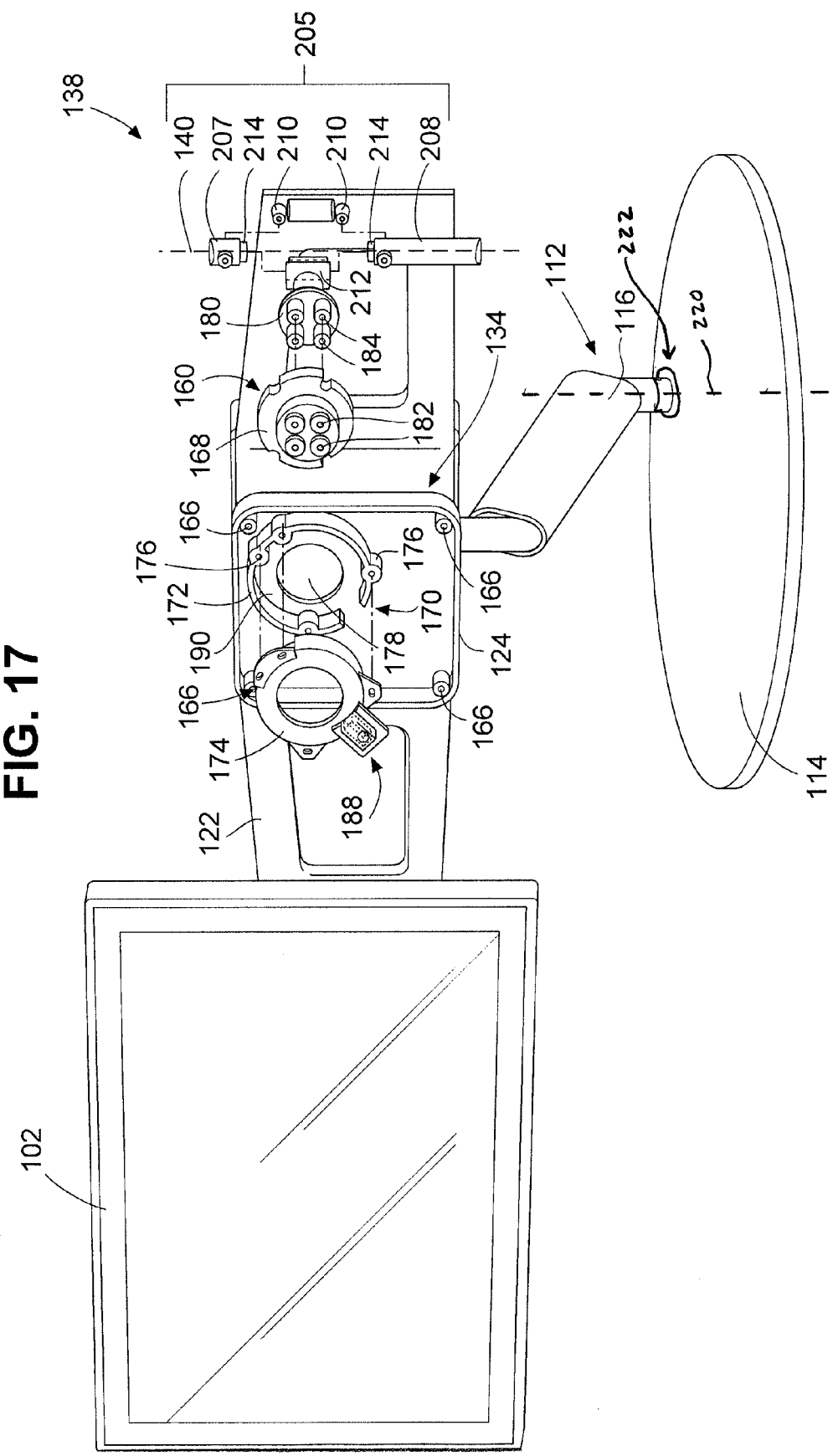
FIG. 17 is a front perspective, partially exploded view of a portion of the display system depicted in FIGS. 1 and 2 showing the first and third axes couplings in accordance with an embodiment of the invention, and an additional coupling between an upwardly extending arm and a base in accordance with another embodiment of the invention.

The first axis coupling 130 and both second axes couplings 134 are similar. Therefore, much of the following description of the second axes couplings 134 will apply to the first axis coupling 130. The second axis coupling 130 for display 103, as illustrated in FIG. 17 (which omits the display device 103 and various screws, washers, gaskets, etc., for clarity), includes a hub assembly 160 that rotatably couples the arm 122 to the display 103 (via third axis coupling 138). In the illustrated embodiment, the hub assembly is held between the rear cover 124 and the rear head frame 164 (FIG. 2) of the display device 103. The rear cover 124 is attached to the rear head frame 164 via screws (not shown) and threaded posts 166. In another embodiment, not illustrated, the hub assembly is held on the inside of the rear head frame 164 between the rear head frame and a head case assembly (not shown) of the display. In both embodiments, a part of the hub assembly is captivated between two parts, i.e., either between the rear cover 124 and the rear head frame 164, or between the rear head frame 164 and a head case assembly.

The hub assembly 160 (FIG. 17) comprises a hub 168 captivated in a hub housing 170 which includes a frame 172, attached to or forming part of the rear cover 124, and a housing cover 174 attached to the housing frame by screws (not shown) and threaded posts 176. The hub 168, captivated in the hub housing 170, and the rear cover 124 are relatively rotatable. The rear cover 124 includes a hole 178 therethrough within the housing frame 172. A mounting disc 180 fixed to the third axis coupling 138 in alignment with the hole is attached to the hub 168 by screws (not shown) that pass through holes 182 in the hub 168 and are threaded to threaded posts 184 on the mounting disc 180. This arrangement allows the rear cover 124 with the display 103 attached thereto to be rotated relative to the arm 116, as illustrated, for example, in FIG. 4 (the hub 168 is fixed to the arm 116 via the mounting disc 180 and the third axis coupling 138, and is rotatable within the hub housing 170 relative to the rear cover 124). A detent mechanism 188, described below, provides detent positions for the hub 168 corresponding to the landscape and portrait orientations of the particular display 102, 103.

Figure 18:
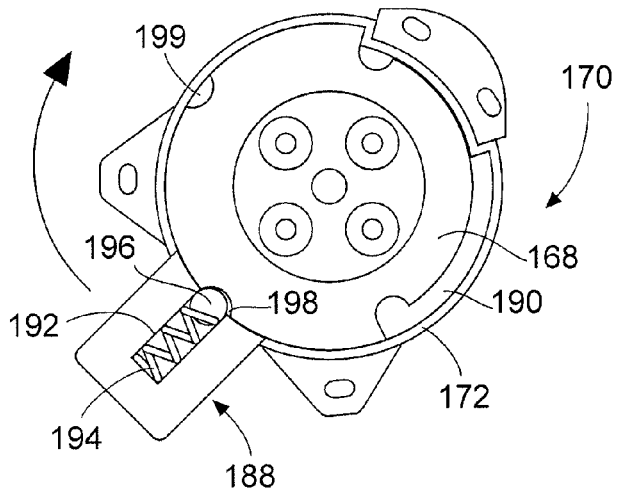
FIGS. 18-20 are views of the second axis coupling for one of the display devices, where
Figure 19:
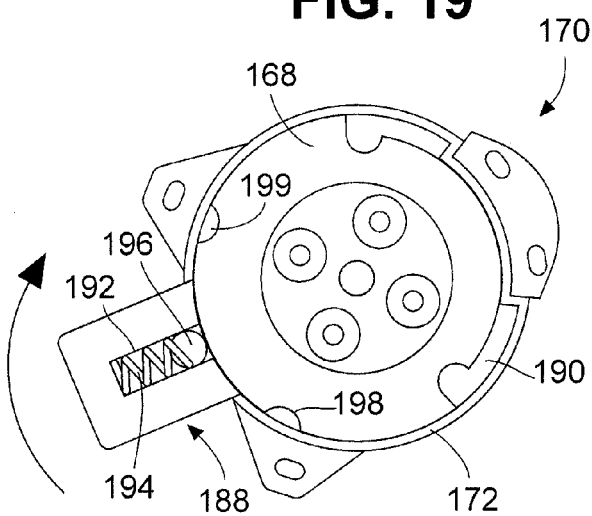
Figure 20:
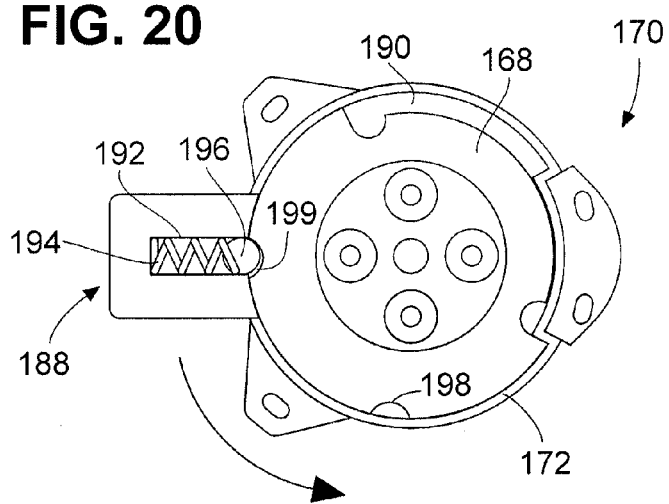

Referring to FIGS. 18-20, the hub 168 is generally disc-like or cylindrical and the hub housing 170 defines a generally cylindrical space 190 within which the hub 168 is received. The housing space 190 and the hub 124 are complementarily configured and sized to permit relative rotation between the two with minimum lateral and axial movement. The detent mechanism 188 is provided as follows. The hub housing 170 includes a blind slot 192 which extends radially with respect to, and opens into, the housing space 190. A coil spring 194 is loaded in the slot 192 and urges a ball bearing 196 positioned at the open end of the slot against the outer periphery of the hub 168. This loads the hub 168 and reduces lateral movement of the hub 168 in the hub housing 170 while introducing a frictional drag to relative rotation between the hub and the housing (which acts to lightly load a display device in a rotated position other than a detent position). The periphery of the hub 168 includes two circular recesses 198 and 199 spaced 90° apart sized to receive a substantial portion of the ball bearing 196 therein. The recesses 198 and 199 cooperate with the ball bearing 196 and the spring 194 to provide detents at the recesses 198 and 199 which define two relative positions of the hub 168, 90° apart, in the hub housing 170, as illustrated in FIGS. 18 and 20. FIG. 18 illustrates the hub 168 in one detent position with the ball bearing 196 engaged in recess 198, and FIG. 20 illustrates the hub 168 in the other detent position with the ball bearing 196 engaged in recess 199. Clockwise movement of the rear cover 124 (to which the hub housing 170 is attached) releases the hub 168 from engagement at recess 198 and into engagement at recess 199 with ball bearing 196, and counter-clockwise movement of the rear cover 124 releases the hub from engagement at recess 199 and into engagement at recess 198 with ball bearing 196. The two engaged positions of hub 168 illustrated in FIGS. 18 and 20 correspond to landscape and portrait orientations of the particular display. The circular configuration of the recesses 198 and 199 facilitates seating and de-seating of the ball bearing 196 therein, and performs a camming function associated with the detent mechanism 190. The relative positions of the hub housing 168 (and rear cover 124) and the hub 168 in FIGS. 18-20 respectively correspond to the positions of display device 103 in FIGS. 2, 4 and 5 (where the second axes couplings 134 are shown in broken lines).

Figure 21:
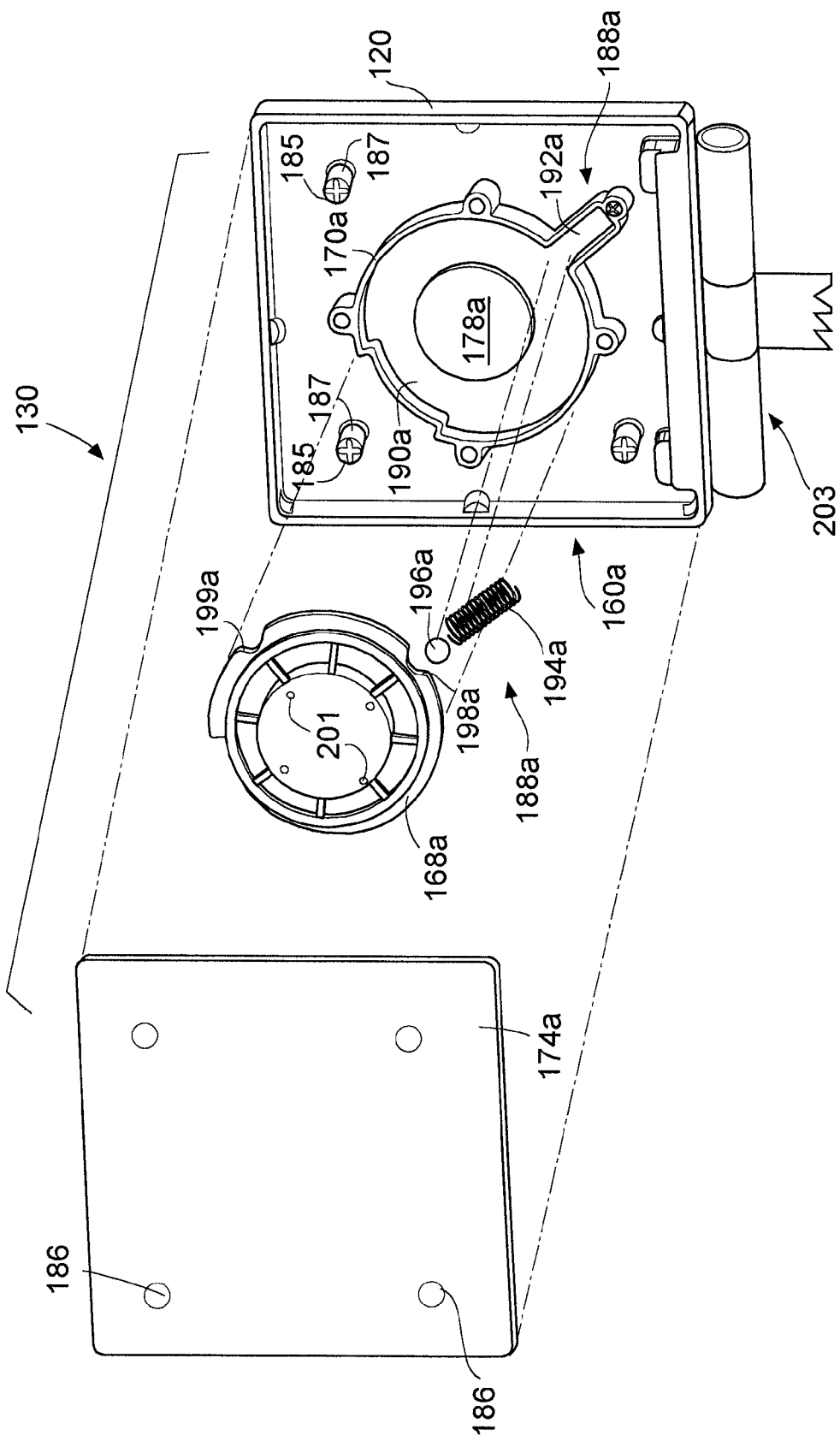
FIG. 21 is an exploded perspective view showing an embodiment of a second axis coupling.

The first axis coupling 130, illustrated in FIG. 21, is similar to the second axis coupling 134 and comprises a hub assembly 160a that provides for relative rotation between the arm 116 and the stand 112. The hub assembly 160a comprises a hub 168a captivated in a hub housing 170a formed in the inside, rear of the bracket 120 and closed by a plate 174a attached to the bracket by screws 185, holes 186 and threaded posts 187. The hub 168a is fixed to the arm 122 (and thereby supports the arm 122 from the stand 112) by screws (not shown) which pass through the arm 122 and a central hole 178a in the bracket 120 and are received in the four screw holes 201 in the central region of the hub 168a. The bracket 120 is fixed to the stand 112 via a hinge 203 (not shown in other figures), which allows the displays 102, 103 to be tilted as a unit relative to the stand 112. Thus, the arm 122 and attached hub 168a are rotatable relative to the bracket 120 and stand 112, as illustrated in FIG. 4, and generally as described above for hub assembly 160.

Like the hub assembly 160, the hub assembly 160a includes a detent mechanism 188a with two detent positions defined by recesses 198a and 199a in the outer periphery of the hub 168a, and a ball bearing 196a loaded against the outer periphery of the hub 168a by a coil spring 194a in a slot 192a. The two detent positions of the hub assembly 160a correspond to the horizontally aligned and vertically aligned configurations of the display devices 102, 103.

Each third axis coupling 138, illustrated in FIG. 17, comprises a tubular hinge 205 including upper and lower hinge bodies 207, 208 fixed to the arm 122 by screws (not shown) received in posts 210 and a rotatable hinge body 212 attached to a respective mounting disc 180 of the respective hub assembly 160 described above. The upper and lower hinge bodies 207, 208 each includes a reduced diameter portion 214 which rotatably nests in an opposite end of the rotatable hinge body 212. Alternatively, a hinge pin (not shown) may be fixed to hinge bodies 207, 208 and rotatably receive the rotatable hinge body 212. As discussed above, the mounting disc 180 is attached to the hub 168, so that the rotatable hinge body 212 rotatably supports a respective display from the arm 122. The rotation provided by the tubular hinges 205 allows the respective display devices to be tilted towards or away from each other, as described above.

Referring to FIG. 17, the displays 102 and 103, the support structure 110 and the arm 116 may be rotated relative to the base 114 in accordance with another embodiment of the invention. In this embodiment, the arm 116 may be rotated about an axis 220 (sometimes referred to as the fifth axis), which in the illustrated embodiment extends perpendicularly to the base 114, e.g., extends vertically. In the illustrated embodiment, axis 220 is parallel to the third axis 140. Any suitable coupling 222 may be used to couple the arm 116 to the base 114 for such rotation.

Embodiments of the disclosed invention have been described and illustrated in an exemplary and non-limiting sense, and the invention as defined by the claims is not to be limited to the precise details of methodology or construction set forth above.

For example, while support structures for two display devices have been illustrated and described, support structures for other embodiments may include more than two display devices. Also, couplings other than those illustrated may be used.

The invention claimed is:

1. A display system comprising two flat panel display devices and a support therefor, the support comprising:
   an arm;
   a coupling for each display device connected to the arm at spaced locations thereof and to the respective display device for rotation about respective parallel axes that are offset from the center of the respective display device and equidistant from adjacent sides of the respective display device to rotatably connect a respective display device to the arm for rotation of the respective display device about the respective parallel axes between landscape and portrait orientations of the respective display device with a same space between the display devices when each is in either a landscape or a portrait orientation.

2. The display system of claim 1, comprising another arm, the arm being rotatably connected to and supported by the other arm at a location between connection of the two display devices to the arm.

3. A support for a display system comprising two flat panel display devices, the support comprising:
   an arm;
   a coupling for each display device connected to the arm at spaced locations thereof and adapted to be connected to the respective display device for rotation about respective parallel axes that are offset from the center of the respective display device and equidistant from adjacent sides of the respective display device, the couplings being adapted to rotatably connect a respective display device to the arm for rotation of the respective display device about the respective parallel axes between landscape and portrait orientations of the respective display device with a same space between the display devices when each is in either a landscape or a portrait orientation.

4. A flat panel display device comprising a coupling connected to the rear thereof to provide for relative rotation between the display and a part of the coupling about an axis offset from the center of the display device and located equidistant from adjacent sides of the display device, the coupling part being adapted to be connected to an arm from which the display device can be supported such that the display device can be rotated relative to the arm about the axis.

* * * * *